United States Patent [19]
Okuhara

[11] Patent Number: 5,507,016
[45] Date of Patent: Apr. 9, 1996

[54] POWER CONTROL CIRCUIT FOR A DIGITAL RADIO TELEPHONE

[75] Inventor: Naoki Okuhara, Tokyo, Japan

[73] Assignee: NEC Corporation, Tokyo, Japan

[21] Appl. No.: 138,005

[22] Filed: Oct. 19, 1993

[30] Foreign Application Priority Data

Oct. 21, 1992 [JP] Japan ................... 4-282643

[51] Int. Cl.⁶ ................................. H04B 1/04
[52] U.S. Cl. ................ 455/126; 455/115; 455/127; 330/129; 330/284
[58] Field of Search .................. 455/126, 127, 455/89, 244.1, 115, 67.1, 67.3, 116; 330/129, 284; 375/59, 60, 295, 297; 370/95.3; 327/91, 94

[56] References Cited

U.S. PATENT DOCUMENTS

| 4,656,630 | 4/1987 | Miyo | 370/95.3 |
| 4,757,502 | 7/1988 | Meuriche et al. | 370/95.3 |
| 4,905,086 | 2/1990 | Tahara | 455/126 |
| 5,054,116 | 10/1991 | Davidson | 455/126 |
| 5,128,629 | 7/1992 | Trinh | 455/126 |
| 5,138,277 | 8/1992 | Robinson et al. | 330/284 |
| 5,172,071 | 12/1992 | Braathen | 455/126 |

FOREIGN PATENT DOCUMENTS 468507 1/1992 European Pat. Off. .
503718 9/1992 European Pat. Off. .

Primary Examiner—Reinhard J. Eisenzopf
Assistant Examiner—Nguyen Vo
Attorney, Agent, or Firm—Young & Thompson

[57] ABSTRACT

A power control device for a digital radio telephone has a variable attenuating circuit for changing input transmit power by a variable amount, a power amplifying circuit for amplifying the input transmit power applied from the variable attenuating circuit, a power detecting circuit for determining whether or not output transmit power has a necessary value, and outputting a voltage proportional to the output transmit power, a reference voltage generating circuit for generating a reference voltage for producing output transmit power having the necessary value, an error detecting circuit for producing a difference between the voltage proportional to the output transmit power and the reference voltage, a voltage generating circuit for generating a control voltage, a holding circuit for holding an output voltage even when an input voltage is absent, and changing, in response to the input voltage, an amount of attenuation of the variable attenuating circuit with the output voltage, a switching circuit for selectively applying the output voltage of the error detecting circuit or the control voltage of the voltage generating circuit to the holding circuit, and a control circuit for controlling the reference voltage generating circuit, voltage generating circuit and switching circuit by sending controls signals thereto.

2 Claims, 5 Drawing Sheets

POWER CONTROL CIRCUIT FOR A DIGITAL RADIO TELEPHONE

BACKGROUND OF THE INVENTION

The present invention relates to a power control circuit and, more particularly, to a power control circuit for controlling the power of a digital radio telephone in the event of the transmission of bursts.

Today, mobile telephone systems in large cities are congested almost to capacity due to the increasing number of subscribers. Hence, to promote effective use of limited frequencies, a digital mobile telephone is in development. A digital mobile telephone is implemented with a three-channel TDMA system in which a single frame has six slots. It has been customary with a power control device incorporated in such a digital mobile telephone to raise a transmission in response to a burst. This, however, brings about a drawback that the transmission cannot rise in a natural manner, degrading the rising characteristic of transmit power. Moreover, since the carrier frequency band broadens, leak power between nearby channels is aggravated.

SUMMARY OF THE INVENTION

It is, therefore, an object of the present invention to provide a power control device for a digital radio telephone which insures the smooth rise of transmit power and prevents leak power between nearby channels from being aggravated by a broad carrier frequency band.

A power control device for a digital radio telephone of the present invention has a variable attenuating circuit for changing input transmit power by a variable amount, a power amplifying circuit for amplifying the input transmit power applied from the variable attenuating circuit, a power detecting circuit for determining whether or not output transmit power has a necessary value, and outputting a voltage proportional to the output transmit power, a reference voltage generating circuit for generating a reference voltage for producing output transmit power having the necessary value, an error detecting circuit for producing a difference between the voltage proportional to the output transmit power and the reference voltage, a voltage generating circuit for generating a control voltage, a holding circuit for holding an output voltage even when an input voltage is absent, and changing, in response to the input voltage, an amount of attenuation of the variable attenuating circuit with the output voltage, a switching circuit for selectively applying the output voltage of the error detecting circuit or the control voltage of the voltage generating circuit to the holding circuit, and a control circuit for controlling the reference voltage generating circuit, voltage generating circuit and switching circuit by sending controls signals thereto.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 5:
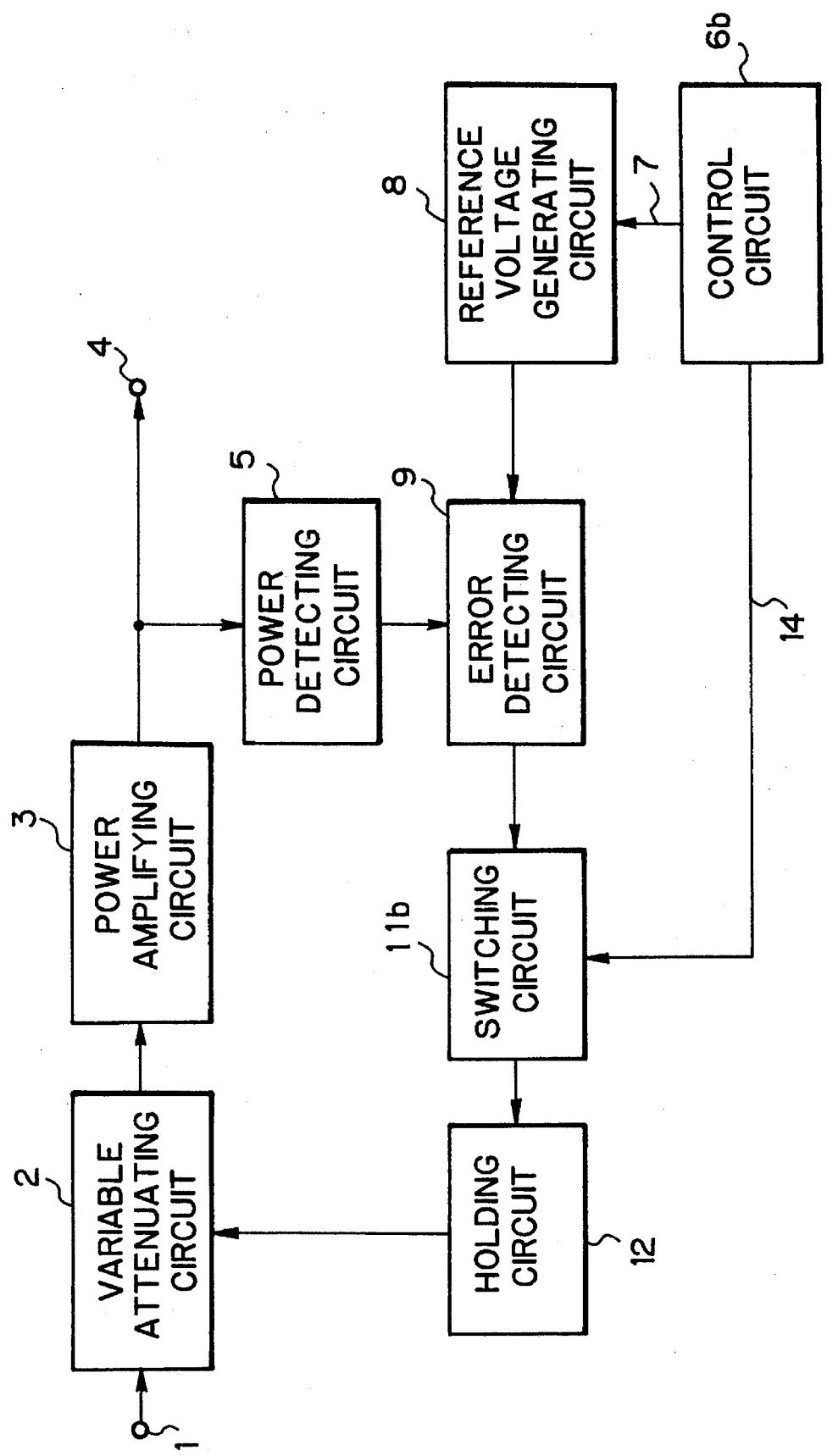
FIG. 5 is a block diagram schematically showing a conventional power control device for a digital radio telephone.

To better understand the present invention, a brief reference will be made to a conventional power control device for a digital radio telephone, shown in FIG. 5. As shown, the power control device has a reference voltage generating circuit 8, and a control circuit 6b capable of changing the output voltage of the circuit 8 with a control signal 7. The control circuit 6b also feeds a control signal 14 to a switching circuit 11b. When the control signal 14 goes high, the output voltage of a holding circuit 12 i s determined. Therefore, the transmit power come in through a radio frequency (RF) input terminal 1 is attenuated by a variable attenuating circuit 2 by an amount determined by the output voltage of the holding circuit 12. The output of the attenuating circuit 2 is amplified by a power amplifier 3 and then fed out via an RF output terminal 4. At this instant, a power detecting circuit 5 transforms the output power to a voltage to see how high the output power is. The reference voltage generating circuit 8 generates a reference voltage for producing transmit power actually needed. An error detecting circuit 9 is implemented by an operational amplifier and determines a difference between the reference voltage and the output voltage of the power detecting circuit 5. However, during the interval $\Delta t$ between the input of a burst and the rise of the control signal 14, the output terminal of the switch 11 is left open, so that the holding circuit 12 does not hold a voltage for raising a transmission in response to a burst. As a result, the output voltage of the holding circuit 12 and, therefore, the rise of the transmission is indefinite.

Figure 3:
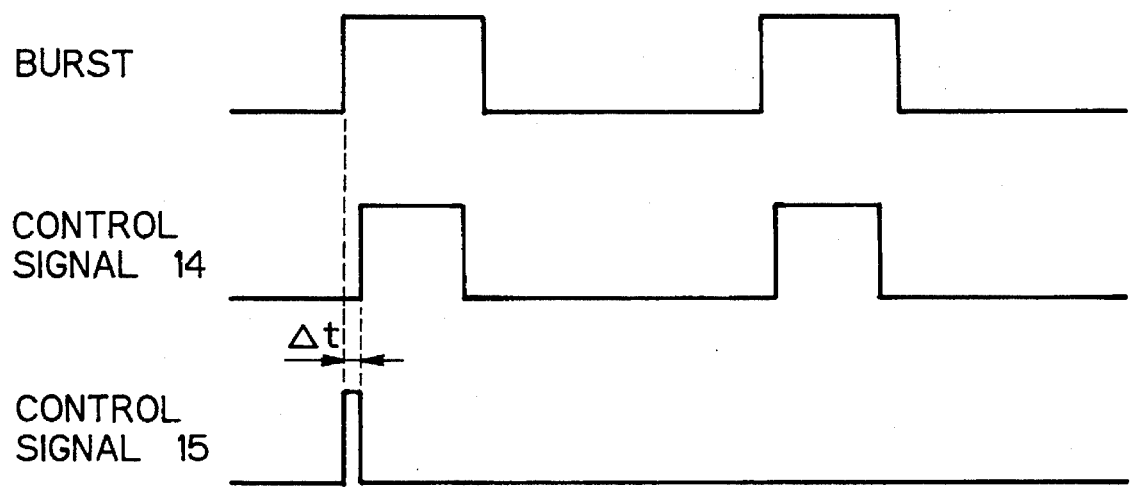
FIG. 3 is a timing chart indicative of a relation between bursts and control signals appearing in the illustrative embodiments.
Figure 6A:
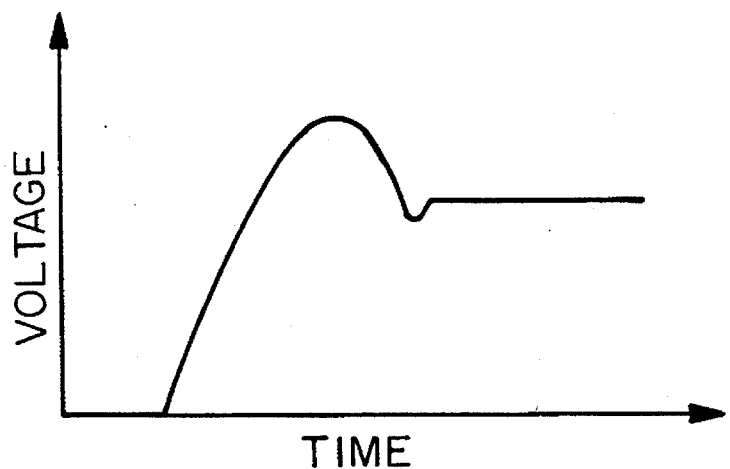
FIGS. 6A and 6B respectively show the overshoot and the unnatural rise of transmit power particular to the conventional power control device.
Figure 6B:
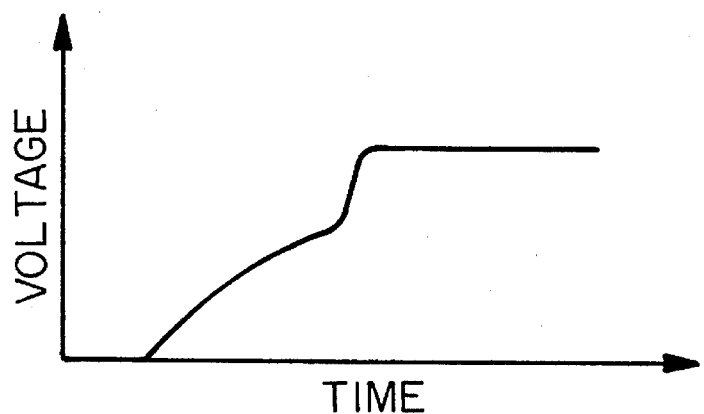

Specifically, the conventional power control device uses a three-channel TDMA system having six slots in a single frame in order to promote effective use of limited frequencies. A transmission, therefore, has to be raised in response to a burst. As shown in FIG. 3, when a burst appears, the control signal 15 remains in a high level for a predetermined period of time $\Delta t$. During this period of time $\Delta t$, a voltage for raising transmit power is not held the holding circuit 12. Further, since the output terminal of the switching circuit 11b is left open, no input voltages are applied to the holding circuit 12. As a result, the output voltage of the circuit 12 and, therefore, the rise of the transmit power is indefinite. In this condition, the transmit power overshoots, as shown in FIG. 6A, or rises in an unnatural manner, as shown in FIG. 6B. On the other hand, assume that the control signal 14 goes high at the same time as a burst as in an analog radio telephone, as shown in FIG. 3. Then, the carrier frequency band broadens to aggravate leak power between nearby channels.

Figure 1:
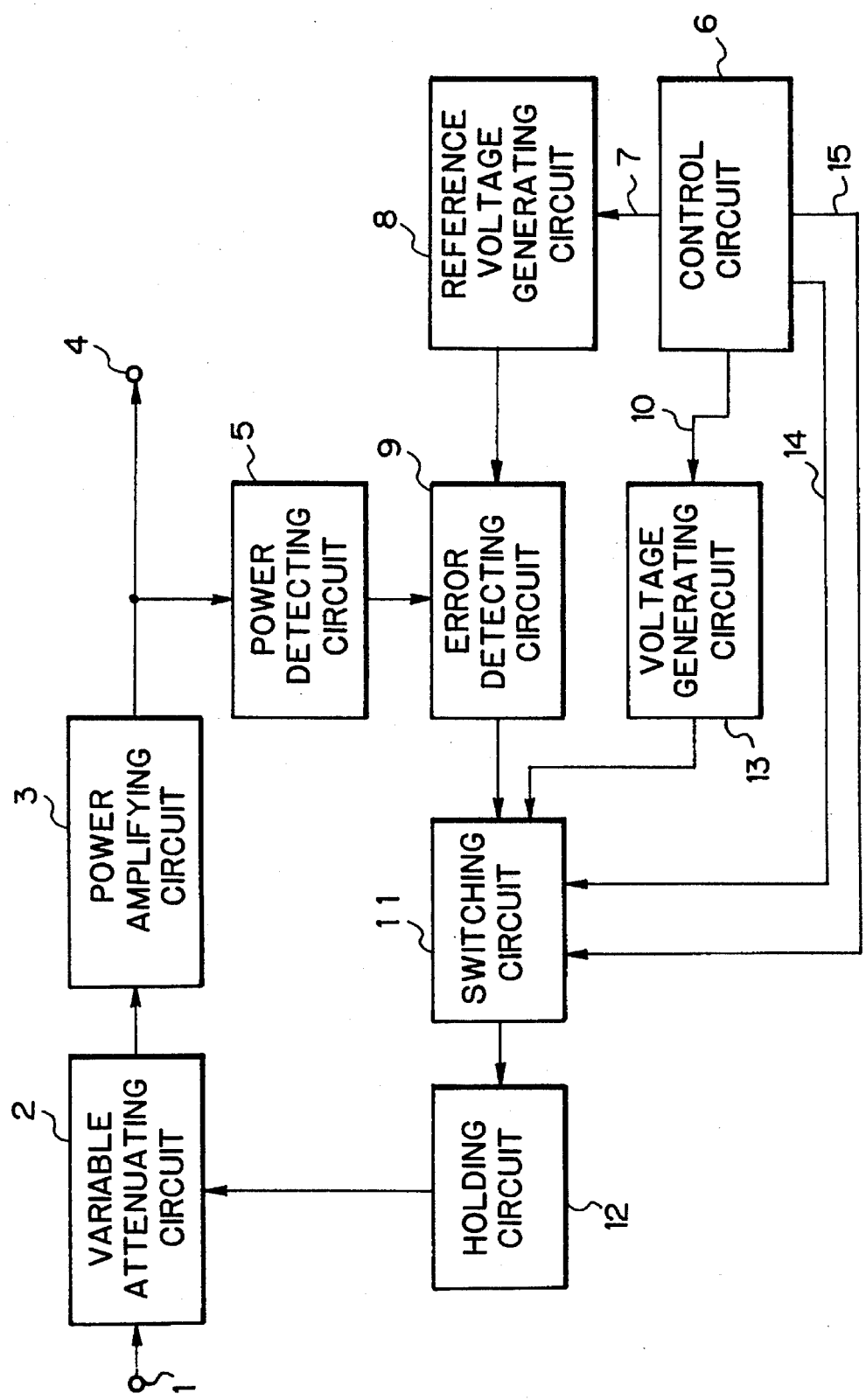
FIG. 1 is a block diagram schematically showing a power control device embodying the present invention.

Referring to FIG. 1, a power control device embodying the present invention will be described. As shown, the power control device has an RF input terminal 1 to which a transmit power is applied. A variable attenuating circuit 2 is capable of changing the amount of attenuation in response to a voltage applied thereto. A power amplifying circuit 3 amplifies the transmit power and is connected to an RF output terminal 4. A power detecting circuit 5 determines whether or not the power amplifying circuit 3 has output necessary power, and transforms the output of the circuit 3 to a voltage proportional thereto. A reference voltage generating circuit 8 generates a reference voltage for generating necessary power. An error detecting circuit 9 produces a difference between the output voltage of the reference voltage generating circuit 8 and the output voltage of the power detecting circuit 5. A voltage generating circuit 13 generates a control voltage. A holding circuit 12 is capable of holding an output voltage even when an input voltage is absent. A switching circuit 11 selectively connects the error detecting circuit 9 or the voltage generating circuit 13 to the holding circuit 12. A control circuit 6 generates a control signal 7 for changing the output voltage of the reference voltage generating circuit 8, a control signal 10 for changing the output voltage of the voltage generating circuit 13, and control signals 14 and 15 for operating the switching circuit 11.

Figure 4:
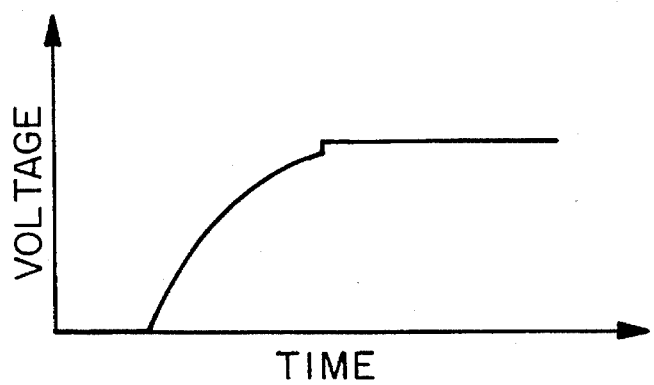
FIG. 4 shows a specific waveform representative of the rise of transmit power achievable with the embodiments.

A reference will be made to FIGS. 3 and 4, as well as to FIG. 1, for describing the operation of the embodiment. As shown in FIG. 3, when a burst appears, the control signal 15 remains in a high level for a predetermined period of time Δt. During this period of time Δt, a voltage for raising a transmission is not held in the holding circuit 12. Further, since the output terminal of the switching circuit 11 is left open, no input voltages are applied to the holding circuit 12. As a result, the output voltage of the holding circuit 12 and, therefore, the rise of the transmit power is indefinite. However, in the illustrative embodiment, the control signal 10 from the control circuit 6 causes the output voltage of the voltage generating 13 to be approximate to a voltage which will appear when the control signal 14 goes high. Hence, when a transmission rises in response to the first burst, the control signal 15 rises immediately. At this instant, the holding circuit 12 is connected to the voltage generating circuit 13. As soon as the control signal 15 goes high, the control signal 14 goes high also. Consequently, the holding circuit 12 is brought into connection with the error detecting 9. This is followed by the operation described in relation to the prior art shown in FIG. 5.

Figure 2:
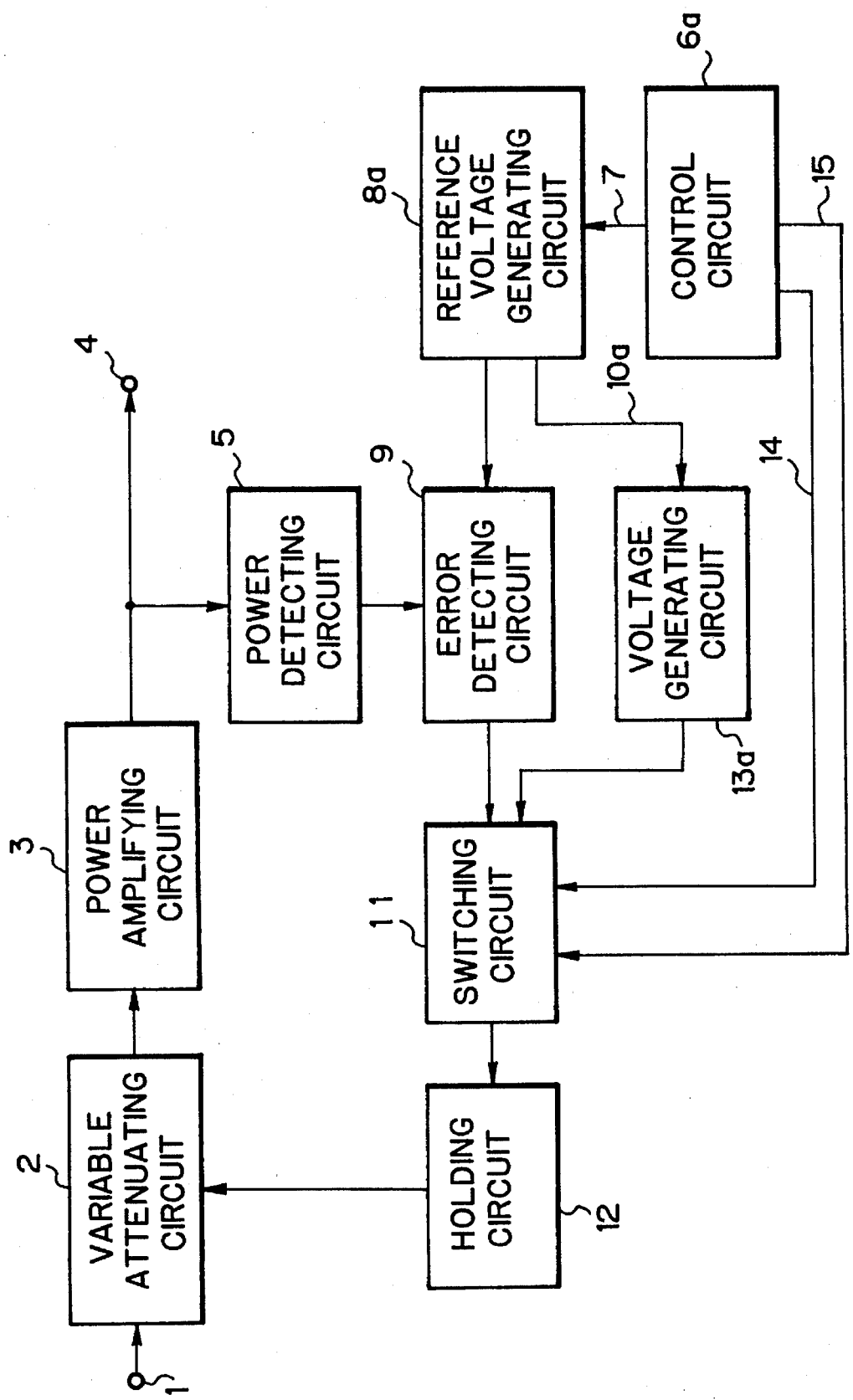
FIG. 2 is a block diagram schematically showing an alternative embodiment of the present invention.

An alternative embodiment of the present invention will be described with reference to FIG. 2. In FIG. 2, the same constituents as the constituents of the previous embodiment are designated by the same reference numerals, and a detailed description thereof will not be made to avoid redundancy. As shown, this embodiment has a reference voltage generating circuit 8a, a voltage generating circuit 13a, and a control circuit 6a in place of the reference voltage generating circuit 8, voltage generating circuit 13a, and control circuit 6, respectively. The reference voltage generating circuit 8a generates two different reference voltages for producing necessary power. One of the two reference voltages, labeled 10a, is applied to the voltage generating circuit 13a in response to the control signal 7. The voltage generating circuit 13a generates an output voltage to which the voltage from the reference voltage generating circuit 8a has been added. The control circuit 6a does not feed the control signal 10 to the voltage generating circuit 13a. While the embodiment of FIG. 1 changes the output voltage of the voltage generating 13 by the control signal 10 from the control circuit 6, the embodiment of FIG. 2 adds one of the output voltages of the reference voltage generating circuit 8a to the voltage of the voltage generating circuit 13a. The control signal 7 from the control circuit 6a changes the output voltage of the voltage generating circuit 13a, whereby the number of control signals from the controller 6a is reduced by one. Regarding the of the operation, this embodiment is identical with the embodiment described previously.

In summary, in a conventional power control device, while the first control signal from a control circuit to a switching circuit is in a high level, a voltage for raising a transmission is not held in a holding circuit. Further, since the output terminal of the switching circuit is left open, no input voltages are applied to the holding circuit. As a result, the output voltage of the holding circuit is indefinite, causing transmit power to overshoot or to rise in an unnatural manner. In accordance with the present invention, since a voltage is applied from a voltage generating circuit to the holding circuit, the transmit power rises smoothly. This prevents the leak power between nearby channels due to a broad carrier frequency band from being aggravated.

Various modifications will become possible for those skilled in the art after receiving the teachings of the present disclosure without departing from the scope thereof.

What is claimed is:

1. A power control device for a digital radio telephone, comprising:

a variable attenuating circuit for changing an input transmit power by a variable amount;

a power amplifying circuit for amplifying the input transmit power applied from said variable attenuating circuit;

a power detecting circuit coupled to an output of the power amplifying circuit for determining whether or not output transmit power has a necessary value, and outputting a voltage proportional to said output transmit power;

a reference voltage generating circuit for generating a reference voltage for producing said output transmit power having said necessary value;

an error detecting circuit for producing a difference between said voltage proportional to said output transmit power and said reference voltage;

a voltage generating circuit for generating a control voltage;

a switching circuit for selectively outputting a switching circuit output voltage corresponding to an output of said error detecting circuit or an output of said control voltage of said voltage generating circuit;

a holding circuit for holding an output voltage even when said switching circuit output voltage is absent, and changing, in response to said switching circuit output voltage, an amount of attenuation of said variable attenuating circuit with said output voltage; and a control circuit for controlling said reference voltage generating circuit, and said switching circuit by sending control signals thereto.

2. A device as claimed in claim 1, wherein said voltage generating circuit produces said control voltage by adding a predetermined voltage to said reference voltage of said reference voltage generating circuit.

* * * * *

UNITED STATES PATENT AND TRADEMARK OFFICE
CERTIFICATE OF CORRECTION

PATENT NO. : 5,507,016
DATED : April 9, 1996
INVENTOR(S) : Naoshi OKUHARA

It is certified that error appears in the above-indentified patent and that said Letters Patent is hereby corrected as shown below:

ON THE TITLE PAGE:

Item [75], change "Naoki" to --Naoshi--.

Signed and Sealed this

Ninth Day of July, 1996

Attest:

BRUCE LEHMAN

Attesting Officer

Commissioner of Patents and Trademarks